Patented June 3, 1924.

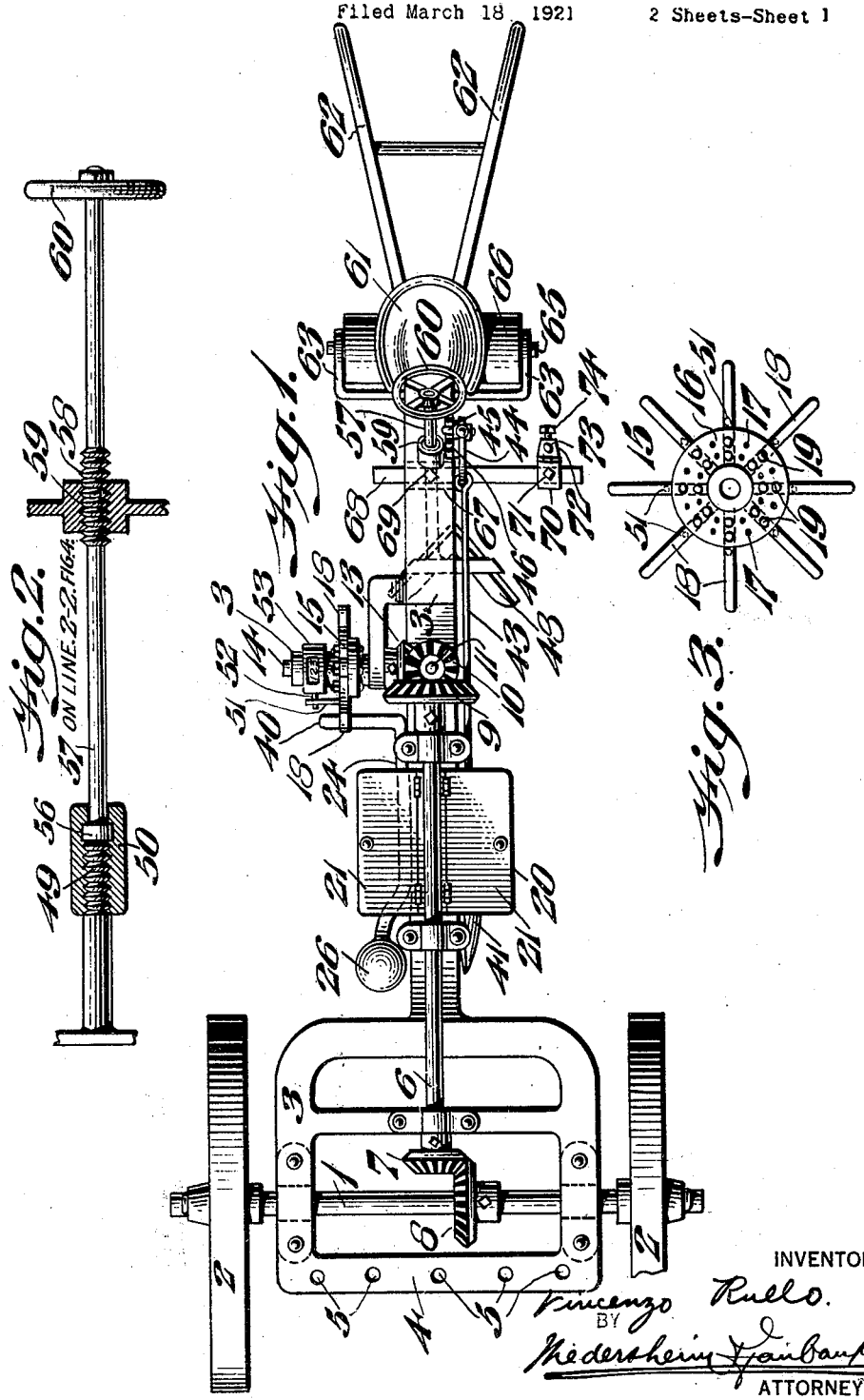

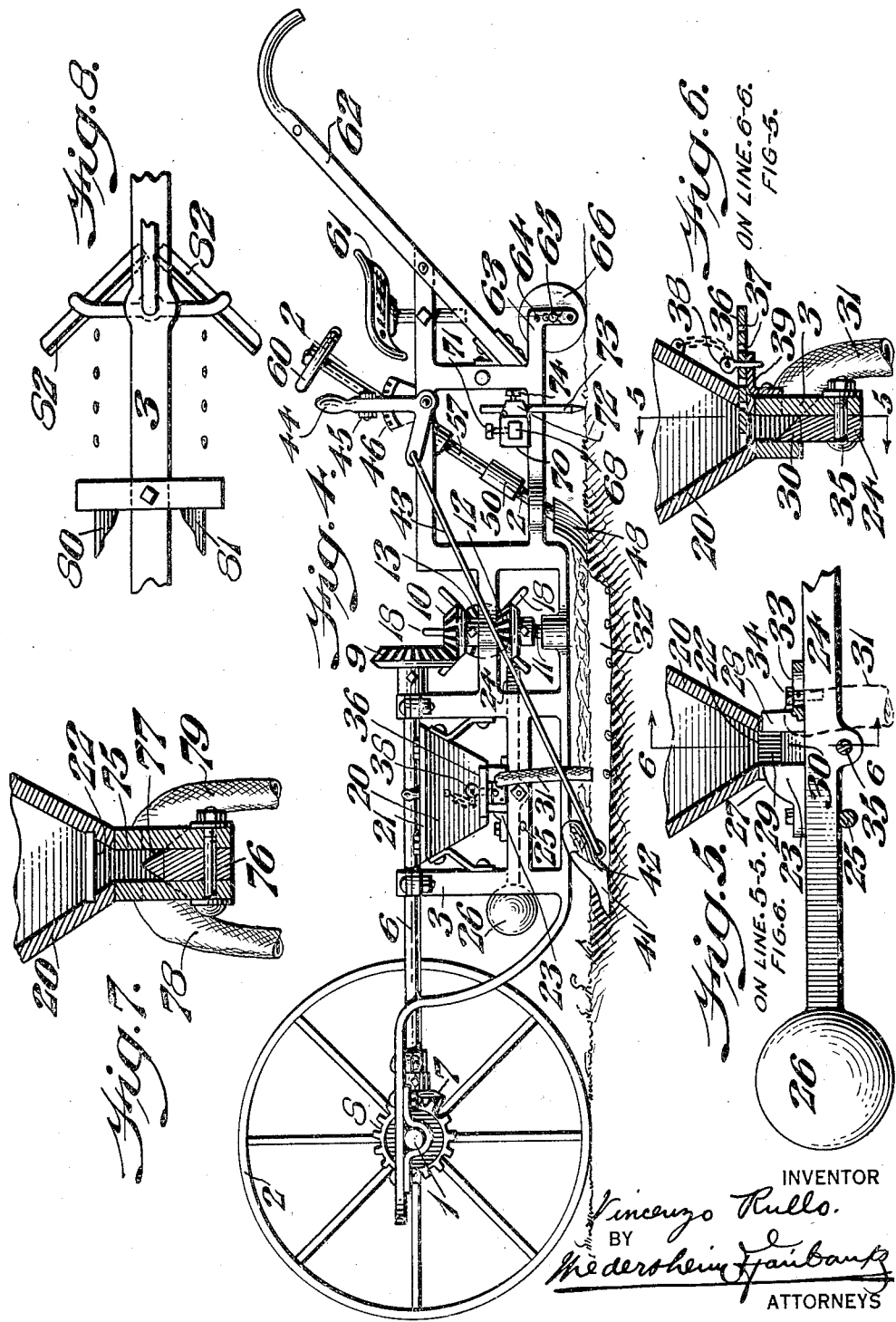

1,496,604

UNITED STATES PATENT OFFICE.

VINCENZO RULLO, OF EDDYSTONE, PENNSYLVANIA.

SEED PLANTER.

Application filed March 18, 1921. Serial No. 453,432.

*To all whom it may concern:*

Be it known that I, VINCENZO RULLO, a subject of the King of Italy, residing at Eddystone, county of Delaware, State of Pennsylvania, have invented a new and useful Seed Planter, of which the following is a specification.

My present invention comprehends a novel construction and arrangement of a seed planter wherein the furrow is opened, the seeds deposited at predetermined distances apart, means being provided for covering the seeds and pressing down the soil.

It further comprehends a novel construction of a seed planter having novel means for controlling the feed of the seed from the feed hopper and novel means for registering the number of seeds deposited.

It further comprehends novel means for planting a plurality of rows simultaneously.

Other novel features of construction and advantage will hereinafter more clearly appear in the detailed description of the invention.

For the purpose of illustrating my invention, I have shown in the accompanying drawings typical embodiments thereof which are at present preferred by me, since these embodiments will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a top plan view of a seed planter embodying my invention.

Figure 2 represents a section substantially on line 2—2 certain parts being omitted for the sake of clearness of illustration.

Figure 3 represents, in side elevation, the actuating device seen in Figure 4 for controlling the feed of the seeds.

Figure 4 represents, in side elevation, the construction seen in Figure 1.

Figure 5 represents a section on line 5—5 of Figure 6.

Figure 6 represents a section on line 6—6 of Figure 5.

Figure 7 represents in section another embodiment of my invention for simultaneously planting a plurality of rows.

Figure 8 represents a top plan view of a portion of the construction employed when a plurality of rows are being planted.

Similar numerals of reference indicate corresponding parts.

Referring to the drawings, 1 designates a shaft on which are mounted the wheels 2. This shaft has journalled on it a frame 3 having at its front end a laterally extending bar 4 which is apertured, as at 5, in order to adapt it to be connected to any desired type of power such as, for example, a tractor, although as will be apparent it can be drawn by one or more horses as desired. The frame 3 has journalled in it a shaft 6 provided with a gear 7 which meshes with a gear 8 on the axle shaft 1 so that when the seed planter is moving forwardly, the shaft 6 will be continuously driven. The shaft 6 at its rear end is provided with a gear 9 which meshes with a gear 10 mounted on a shaft 11 journalled in the machine frame. This shaft 11 also carries a gear 12 which meshes with a gear 13 mounted on a shaft 14 journalled in the machine frame. The shaft 14 has secured to it a feed controlling member 15 which is provided with a hub portion 16 having in its periphery a series of apertures 17 adapted to receive the arms 18 which are secured in position by means of fastening devices 19 of any desired type. The arms 18 control the feed of the seeds from the hopper 20 which is carried by the frame 1 and provided with the closures 21 hinged to the hopper. The side walls of the hopper 20 converge downwardly towards a delivery opening 22 beneath which is positioned the feed controlling member 23 carried by a lever 24 which normally rests against a stop 25 carried by the frame and provided with a counterbalance 26 to normally retain it in the position seen in Figure 5. The member 23 is in the form of a block having an upper curved face 27 which when the lever 24 is rocked in a direction to raise the counterbalance 26, the curved face 27 will close the delivery opening 22. The member 23 is provided with a longitudinally adjustable end piece 28 which contributes to form a pocket 29 the bottom face of which is inclined, as at 30, in order that it will communicate with the flexible delivery tube 31, the delivery end of which extends into the furrow 32.

The end member 28 is slotted, as at 33, and a fastening device 34 is provided to secure it in its adjusted position on the lever 24 which is fulcrumed at 35 on the frame 3. The delivery opening 22 may be manually controlled by means of a slide valve 36 having the apertures 37 adapted to receive a pin 38 which extends into the apertured plate 39 carried by the frame, in order to secure the slide valve 36 in its adjusted position. The lever 24 is provided with a laterally extending arm 40, see Figure 1, which is in the path of the arms 18 so that it will be intermittently actuated by said arm to effect the opening and closing of the delivery opening 22 of the seed hopper 20.

The furrow 32 is opened by means of a plow 41 which is pivotally connected to the frame at 42 and this plow 41 has connected to it a link 43 which is connected to a bell crank lever 44 which carries a pawl 45 adapted to cooperate in the usual manner with a stationary rack segment 46. It will thus be seen that by proper actuation of the lever 44 the depth of the furrow 42 formed by the plow 41 may be varied, as desired.

In order to provide for covering up the seed, after it has been deposited in the furrow 32, I provide the plow member 47, the body portion of which is preferably V-shaped and provided with the inturned bottom flange 48. The plow 47 is provided with a threaded stem 49, see Figure 2, which is in threaded engagement with a coupling sleeve 50 in which is freely rotatable the head 56 of a shaft 57 which is threaded, as at 58, in order to engage the threaded portion 59 of the frame. The shaft 57 is provided with a hand wheel 60 by means of which it is manipulated so that it can be raised and lowered as desired. It will be seen that the connection from the hand wheel 60 to the plow 47 is made in sections so that different types and forms of seed covering implements may be substituted for the seed covering member 47 illustrated, in accordance with the conditions and requirements met with in practice.

The frame 3 in proximity to the hand wheel 60 carries a vertically adjustable seat 61 for the operator in case he desires to ride. In rear of the seat 61 the frame 3 has connected to it in any desired manner the handle bar 62. The frame 3 at its rear end is provided with the spaced arms 63 which are apertured, as at 64, in order to receive the trunnion 65 of a roller 66, so that the soil will be properly kept down against the planted seed. I provide a plurality of vertically spaced apertures 64 to receive the trunnion 65 so that the pressure of the roller 66 will vary according to the character of seed which is being planted.

In order to provide means for marking the line of the next row which is to be planted the frame 3 is provided with a laterally apertured boss 67 through which is slidable a bar 68 which is secured in its adjusted position by means of a set screw 69. This bar 68 has slidable on it a collar 70 which is secured in its adjusted position by means of a set screw 71. The collar 70 has hinged to it a block 72 which is apertured to receive a marking rod 73 which is longitudinally adjustable therein and secured in position by means of a set screw 74.

In the embodiments seen in Figures 7 and 8, I have shown the planter as adapted to plant a plurality of rows at the same time. In these embodiments the delivery opening 22 has the rectangular or other shaped passage 75 in which is pivoted a lever 76 corresponding in construction and operation with the lever 24 but provided with the reversely inclined faces 77 which will cause the seeds to pass into the delivery flexible pipes 78 and 79. The frame 3 in this case is provided with a plurality of plows 80 and 81 and the plow 82 which will be connected to the coupling sleeve 55 and controlled by the wheel 60.

In order that the number of seeds deposited in the furrow or furrows may be accurately determined, I preferably provide each detachable spoke 18 with a pin 51 which travels in the path of the operating arm 52 of the recorder 53 which records and registers the number of times the lever 24 which forms a valve is actuated and thus the number of seeds deposited. The distance between the seeds in a furrow may be varied, as desired, by removing or inserting the spokes 18 so as to vary the time at which the lever 24 is actuated.

It will now be apparent that I have devised a new and useful seed planter which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. The combination with a hopper of a dispensing lever movable between the lower side walls of the hopper and providing means to define a measuring pocket, the bottom of the pocket being of inverted V-shape and adapted in displacement of the lever to discharge the contents of the pocket to opposite sides of the lever.

2. In a seed planter, a seed hopper, a dispensing lever movable between the lower side walls of the hopper and providing means to define a measuring pocket, the top of said lever having an inclined wall within said pocket and adapted in displacement of the lever to discharge the contents of the pocket through a side thereof.

VINCENZO RULLO.

Witnesses:
C. D. McVay.
M. E. Byrne.